(12) United States Patent
Kaito et al.

(10) Patent No.: US 7,935,445 B2
(45) Date of Patent: May 3, 2011

(54) LITHIUM ION SECONDARY BATTERY

(75) Inventors: Tsuyoshi Kaito, Kyoto (JP); Futoshi Tanigawa, Fujisawa (JP); Naoto Arai, Ikoma (JP)

(73) Assignee: Panasonic Corporation, Osaka (JP)

( * ) Notice: Subject to any disclaimer, the term of this patent is extended or adjusted under 35 U.S.C. 154(b) by 1220 days.

(21) Appl. No.: 11/433,672

(22) Filed: May 15, 2006

(65) Prior Publication Data

US 2006/0204836 A1    Sep. 14, 2006

Related U.S. Application Data

(62) Division of application No. 10/442,242, filed on May 21, 2003, now Pat. No. 7,335,448.

(30) Foreign Application Priority Data

May 30, 2002  (JP) ................................ 2002-156892

(51) Int. Cl.
H01M 6/18      (2006.01)
H01M 6/00      (2006.01)
H01M 2/14      (2006.01)
H01M 2/18      (2006.01)
H01M 2/02      (2006.01)
H01M 2/16      (2006.01)

(52) U.S. Cl. ........ 429/323; 429/164; 429/133; 429/139; 429/122; 429/246

(58) Field of Classification Search .................. 429/323, 429/231.95, 209, 247, 246, 164, 133, 139, 429/122

See application file for complete search history.

(56) References Cited

U.S. PATENT DOCUMENTS

| 5,415,948 | A | * | 5/1995 | Gauthier et al. ................ 429/62 |
| 6,376,128 | B1 | | 4/2002 | Goto |
| 6,387,564 | B1 | | 5/2002 | Yamashita et al. |
| 6,884,546 | B1 | | 4/2005 | Fujita et al. |

FOREIGN PATENT DOCUMENTS

CN    1251215 A    4/2000

(Continued)

OTHER PUBLICATIONS

Japanese Office Action issued in Japanese Patent Application No. 2003-149836, mailed Sep. 17, 2009.

(Continued)

*Primary Examiner* — Helen O Conley
(74) *Attorney, Agent, or Firm* — McDermott Will & Emery LLP

(57) ABSTRACT

A lithium ion secondary battery includes: (a) a positive electrode plate comprising an active material part and a current collector carrying the active material part, the active material part comprising a positive electrode active material capable of absorbing or desorbing a lithium ion during charge and discharge; (b) a negative electrode plate comprising an active material part and a current collector carrying the active material part, the active material part comprising a negative electrode active material capable of absorbing or desorbing a lithium ion during charge and discharge; (c) a separator interposed between the positive and negative electrode plates; (d) an electrolyte; and (e) a battery case accommodating the positive and negative electrode plates, the separator, and the electrolyte. The positive and negative electrode plates are wound with the separator interposed therebetween, thereby to form an electrode plate assembly. The electrode plate assembly is so configured that each lengthwise edge of the positive electrode current collector is positioned on an outer side of each lengthwise edge of the negative electrode active material part.

6 Claims, 8 Drawing Sheets

FOREIGN PATENT DOCUMENTS

| | | |
|---|---|---|
| CN | 1264928 A | 8/2000 |
| JP | 9-213338 | 8/1997 |
| JP | 09-213338 | 8/1997 |
| JP | 10-241735 | 9/1998 |
| JP | 11-238527 A | 8/1999 |
| JP | 2000-030742 | 1/2000 |
| JP | P2000-30742 A | 1/2000 |

OTHER PUBLICATIONS

United States Office Action issued in U.S. Appl. No. 11/433,673 dated Mar. 30, 2010.

United States Office Action issued in U.S. Appl. No. 11/433,673 dated Aug. 17, 2010.

* cited by examiner

FIG. 11
FIG. 12
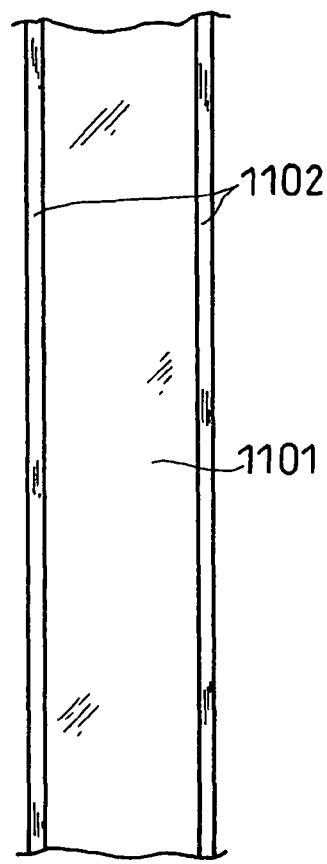
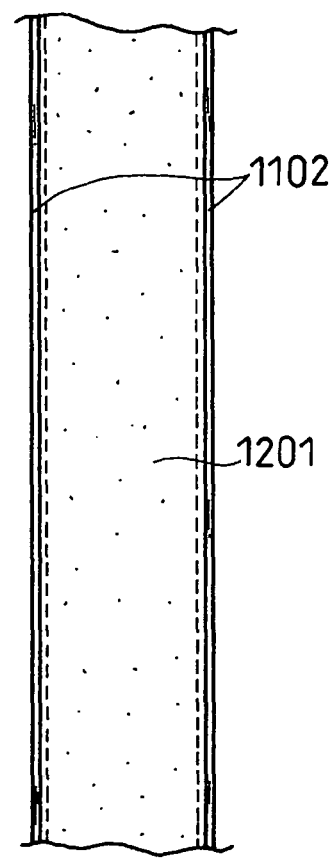
FIG. 13
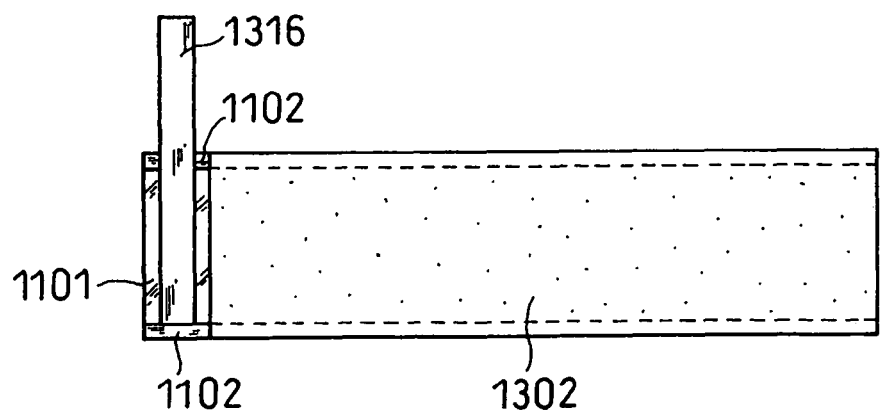

FIG.16
FIG.17
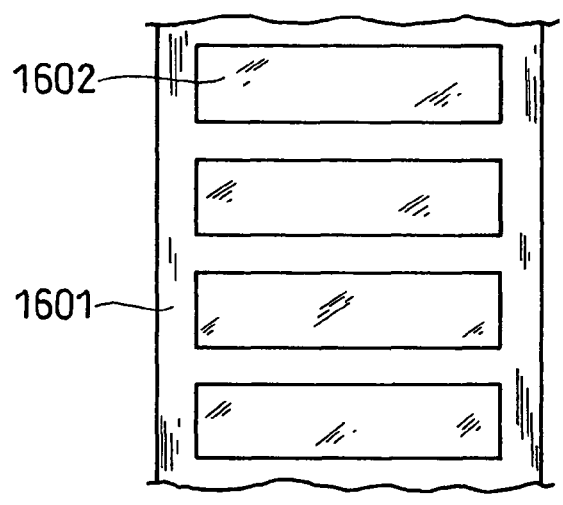
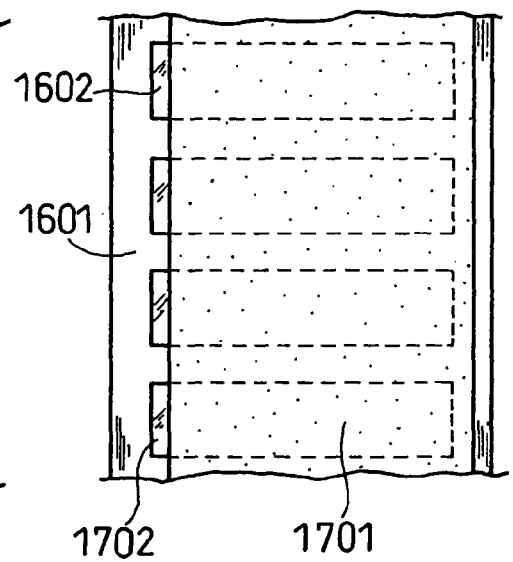
FIG.18
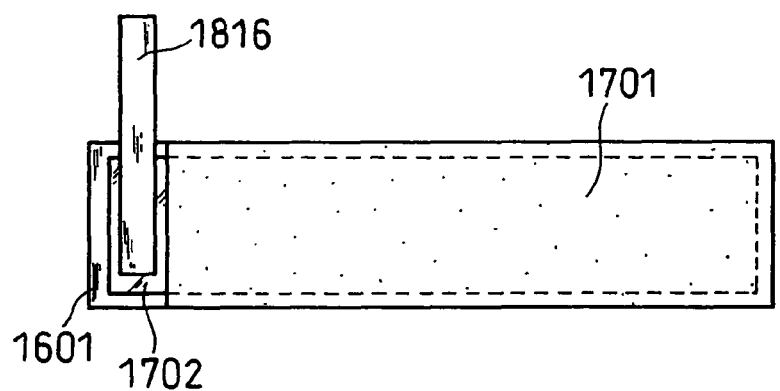

LITHIUM ION SECONDARY BATTERY

RELATED APPLICATIONS

This application is a divisional of application Ser. No. 10/442,242, currently U.S. Pat. 7,335,448, filed on May 21, 2003, which in turn claims the benefit of Japanese Application No. 2002-156892, filed on May 30, 2002, the disclosures of which Applications are incorporated by reference herein.

BACKGROUND OF THE INVENTION

With the rapidly growing trend toward cordless and more portable electronic equipment such as audio-visual equipment or personal computers, there is an increasing demand that secondary batteries be smaller and more lightweight with higher energy density as the driving power source. Among such secondary batteries, lithium ion secondary batteries including lithium as an active material particularly have high voltage and high energy density.

Of conventional lithium ion secondary batteries, wound-type batteries are predominant. Wound-type batteries have an electrode plate assembly in which a positive electrode plate and a negative electrode plate are wound with a separator interposed between the electrode plates. The positive electrode plate comprises a positive electrode active material part and a positive electrode current collector carrying the positive electrode active material part, and the negative electrode plate comprises a negative electrode active material part and a negative electrode current collector carrying the negative electrode active material part. The positive electrode active material part comprises a positive electrode active material capable of absorbing or desorbing a lithium ion during charge and discharge, and the negative electrode active material part comprises a negative electrode active material capable of absorbing or desorbing a lithium ion during charge and discharge. The electrode plate assembly is accommodated with an electrolyte in a battery case.

In the case of wound-type batteries, when the electrode plates are wound, the electrode plates and the separator are deformed where they are bent or curved. Such deformation may trigger an internal short-circuit. Also, deviation in position of the separator upon the winding of the electrode plates may induce an internal short-circuit.

In view of the above points, the inventors of the present invention have focused on eliminating the main cause of the internal short-circuit in wound-type lithium ion secondary batteries.

The internal short-circuit may be classified into the following four types:

(1) A short-circuit between the positive electrode active material part and the negative electrode active material part.

(2) A short-circuit between the positive electrode active material part and the negative electrode current collector.

(3) A short-circuit between the positive electrode current collector and the negative electrode active material part.

(4) A short-circuit between the positive electrode current collector and the negative electrode current collector.

The inventors of the present invention observed the presence or absence of a spark and ignition by decomposing overcharged batteries into respective parts and bringing the respective parts in direct contact with each other. As a result, in short-circuit types (1) and (2), neither spark nor ignition occurred, but in short-circuit type (3), a spark and ignition occurred. In short-circuit type (4), although a spark occurred, ignition did not take place.

These results indicate the following:

In short-circuit types (1) and (2), the resistance of the positive electrode active material itself is large, so that a large current does not flow even if the positive electrode active material part and the negative electrode active material part are short-circuited.

In short-circuit type (4), a spark is caused by the short-circuit between the conductive current collectors. However, since the current collectors themselves are not flammable, the short-circuit does not result in ignition.

In short-circuit type (3), since the positive electrode current collector and the negative electrode active material are both conductive, the short-circuit between them causes a spark, resulting in ignition of the flammable negative electrode active material.

The above observations suggest that short-circuit type (3) is the main cause of the internal short-circuit. The short-circuit type (3) actually takes place when conductive burrs come in contact with the surface of the negative electrode active material part. The burrs are produced when the positive electrode current collector is slit.

Recently, there has been proposed a stacked type lithium ion secondary battery comprising an electrode plate assembly in which a positive electrode plate and a negative electrode plate are stacked with an electrolyte layer, instead of a conventional separator, interposed between the electrode plates. With respect to such batteries that the electrolyte layer is integrated to the positive electrode plate and the negative electrode plate, Japanese Laid-Open Patent Publication No. 2000-30742, for example, proposes to prevent the short-circuit by regulating the dimensions of the electrode plates and the separator. However, the production process of such a stacked/integrated type electrode plate assembly is generally complicated, and heightening the capacity is also difficult. Further, from the viewpoint of making the battery more lightweight, Japanese Laid-Open Patent Publication No. Hei 9-213338, for example, proposes to use a current collector comprising a resin film such as polyethylene terephthalate and a metal deposited film formed on the surface of the resin film in such an electrode plate assembly.

BRIEF SUMMARY OF THE INVENTION

In view of the above-described findings, an object of the present invention is to produce a wound-type lithium ion secondary battery with high safety by preventing the short-circuit between burrs of a positive electrode current collector and a negative electrode active material part.

A lithium ion secondary battery in accordance with the present invention includes: (a) a positive electrode plate comprising a positive electrode active material part and a positive electrode current collector carrying the positive electrode active material part, the positive electrode active material part comprising a positive electrode active material capable of absorbing or desorbing a lithium ion during charge and discharge; (b) a negative electrode plate comprising a negative electrode active material part and a negative electrode current collector carrying the negative electrode active material part, the negative electrode active material part comprising a negative electrode active material capable of absorbing or desorbing a lithium ion during charge and discharge; (c) a separator interposed between the positive electrode plate and the negative electrode plate; (d) an electrolyte; and (e) a battery case accommodating the positive electrode plate, the negative electrode plate, the separator, and the electrolyte.

The positive electrode plate and the negative electrode plate are wound with the separator interposed therebetween, thereby to form an electrode plate assembly. The lithium ion secondary battery in accordance with the present invention has either one of the following characteristics [A] to [E] with respect to the electrode plate assembly:

[A] Each lengthwise edge of the positive electrode current collector is positioned on an outer side of each lengthwise edge of the negative electrode active material part.

[B] Each lengthwise edge of the positive electrode active material part is positioned on an outer side of each lengthwise edge of the positive electrode current collector.

[C] Each lengthwise edge of the negative electrode active material part is positioned on an outer side of each lengthwise edge of the positive electrode current collector, each lengthwise edge of the positive electrode current collector is positioned on an outer side of each lengthwise edge of the positive electrode active material part, and exposed parts of the positive electrode current collector which are not covered with the positive electrode active material part are coated with an insulating material.

[D] The positive electrode current collector comprises an insulating sheet and a conductive layer formed on each side of the insulating sheet, and an exposed part of the insulating sheet which is not covered with the conductive layer is provided at each lengthwise edge of the insulating sheet.

[E] Each lengthwise edge of the positive electrode plate is coated with an insulating material.

As the separator, woven fabric, non-woven fabric or a micro-porous film comprising, for example, polyolefin may be used.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 11 is a top view of a positive electrode current collector, showing a process for producing a positive electrode plate in Example 2 of the present invention.

FIG. 12 is another top view of the positive electrode current collector, showing the process for producing the positive electrode plate in Example 2 of the present invention.

FIG. 13 is a front view of the positive electrode plate in Example 2 of the present invention.

FIG. 16 is a top view of a positive electrode current collector, showing a process for producing a positive electrode plate in Example 4 of the present invention.

FIG. 17 is another top view of the positive electrode current collector, showing the process for producing the positive electrode plate in Example 4 of the present invention.

FIG. 18 is a front view of the positive electrode plate in Example 4 of the present invention.

DETAILED DESCRIPTION OF THE INVENTION

Embodiment 1

The lithium ion secondary battery in this embodiment has such a structure that each lengthwise edge of the positive electrode current collector is positioned on an outer side of each lengthwise edge of the negative electrode active material part. Thus, even if burrs occur at the edges of the positive electrode current collector when the positive electrode plate is slit, this structure makes it possible to prevent the short-circuit between the burrs and the negative electrode active material part.

On each lengthwise end of the positive electrode current collector, a non-active material part which does not absorb or desorb a lithium ion during charge and discharge may be carried. The non-active material part can stabilize the edges of the positive electrode current collector. Further, the thickness of the non-active material part is preferably the same as that of the positive electrode active material part so that there is no difference in height between them and they make a flat, smooth surface, since this makes winding deviation unlikely to occur upon winding of the electrode plates. The use of an insulating material as the non-active material part can suppress not only the short-circuit between the burrs of the positive electrode current collector and the negative electrode active material part but also general short-circuits.

In the electrode plate assembly, it is preferable that each lengthwise edge of the negative electrode active material part be positioned on an outer side of each lengthwise edge of the positive electrode active material part. This arrangement allows the opposing negative electrode active material to securely receive Li ions released from the positive electrode active material during charge, thereby preventing such problems as unevenness of the load of the negative electrode active material and deposition of metal lithium.

Figure 1:
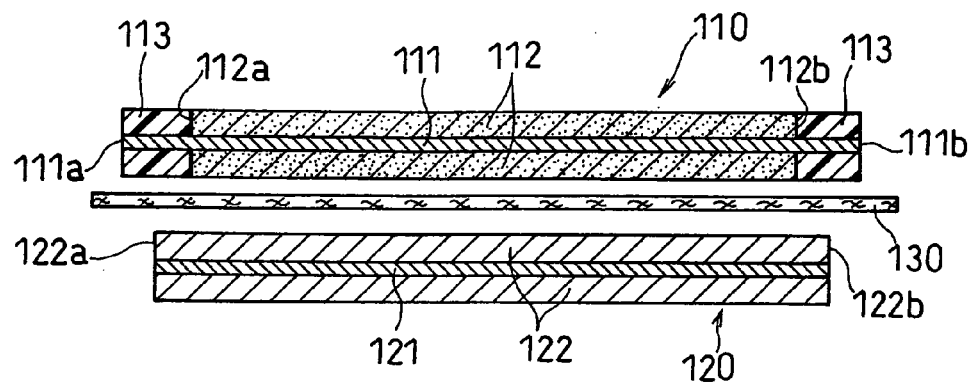
FIG. 1 is a schematic view of a section perpendicular to the longitudinal direction of the positive electrode plate, negative electrode plate and separator of an electrode plate assembly in Embodiment 1 of the present invention.

FIG. 1 is a schematic view of a section perpendicular to the longitudinal direction of a positive electrode plate 110, a negative electrode plate 120 and a separator 130 in an electrode plate assembly of this embodiment. In FIG. 1, in order to facilitate the understanding of the arrangement of the positive electrode plate 110, the negative electrode plate 120 and the separator 130, the respective elements are illustrated with a space interposed between them in the stacking direction.

The positive electrode plate 110 comprises a positive electrode current collector 111 and a positive electrode active material part 112, and the negative electrode plate 120 comprises a negative electrode current collector 121 and a negative electrode active material part 122. The positive electrode plate 110 and the negative electrode plate 120 are opposed to each other with the separator 130 interposed between them. Between an edge 111a of the positive electrode current collector and an edge 112a of the positive electrode active material part and between an edge 111b of the positive electrode current collector and an edge 112b of the positive electrode active material part, there is no coating of the positive electrode active material, and it is preferable to form a non-active material part 113 therebetween.

The lengthwise edges 111a and 111b of the positive electrode current collector 111 are positioned on outer sides of lengthwise edges 122a and 122b of the negative electrode active material part 122. Thus, even if burrs occur at the edge 111a or 111b of the positive electrode current collector and pierce the separator 130, this arrangement does not cause a short-circuit between the burrs and the negative electrode active material part 122.

In employing the structure as illustrated in FIG. 1, it is preferable that the interval between the edge 111a of the positive electrode current collector and the edge 122a of the negative electrode active material part and the interval between the edge 111b of the positive electrode current collector and the edge 122b of the negative electrode active material part be from 50 to 300 µm. These intervals are preferably greater than "A−(B+C)" wherein A is the length of the burrs which are assumed to occur on the slit sections of the positive electrode current collector, B is the thickness of the positive electrode active material part on one side of the positive electrode current collector, and C is the thickness of the separator. The length of the burrs which are assumed to occur on the slit sections of the positive electrode current collector is generally 50 to 100 µm.

Figure 2:
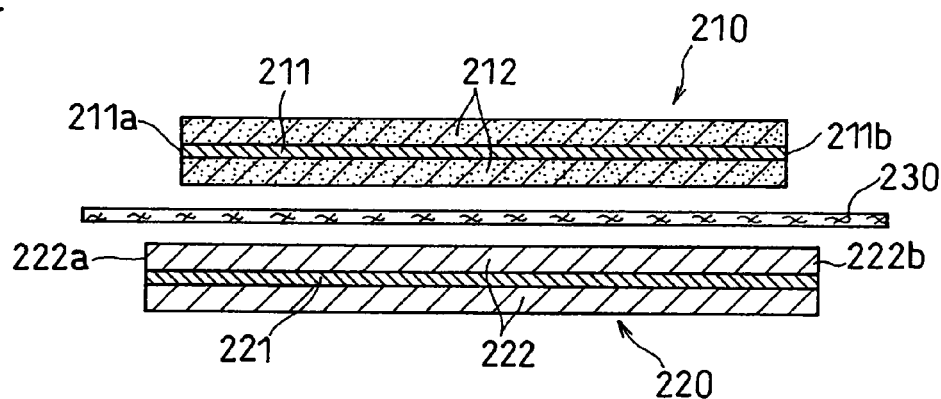
FIG. 2 is a schematic view of a section perpendicular to the longitudinal direction of the positive electrode plate, negative electrode plate and separator of a conventional electrode plate assembly.

FIG. 2 is a schematic view of a section perpendicular to the longitudinal direction of a positive electrode plate 210, a negative electrode plate 220 and a separator 230 in a conventional electrode plate assembly, and FIG. 2 is illustrated in the same manner as FIG. 1.

The positive electrode plate 210 comprises a positive electrode current collector 211 and a positive electrode active material part 212, and the negative electrode plate 220 comprises a negative electrode current collector 221 and a negative electrode active material part 222.

Both lengthwise edges 211a and 211b of the positive electrode current collector are positioned on inner sides of both lengthwise edges 222a and 222b of the negative electrode active material part 222. In such an arrangement, if burrs occur at the edge 211a or 211b of the positive electrode current collector and pierce the separator 230, a short-circuit occurs between the burrs and the negative electrode active material part 222.

Embodiment 2

The lithium ion secondary battery in this embodiment has such a structure that each lengthwise edge of the positive electrode active material part is positioned on an outer side of each lengthwise edge of the positive electrode current collector. In this structure, when the positive electrode active material part is slit near its edges, both the positive electrode current collector and the positive electrode active material part are not slit at the same time, and burrs are therefore unlikely to occur. On the other hand, in the conventional structure as illustrated in FIG. 2, the positive electrode current collector 211 and the positive electrode active material part 212 are slit at the same time, and burrs are therefore likely to occur at the edge 211a or 211b of the positive electrode current collector.

In this embodiment, it is also preferable that each lengthwise edge of the negative electrode active material part be positioned on an outer side of each lengthwise edge of the positive electrode active material part.

An insulating material part extending in the plane of the positive electrode current collector is preferably disposed at each lengthwise edge of the positive electrode current collector. The insulating material part can stabilize the edges of the positive electrode active material part. The insulating material part is preferably connected to the end face of each lengthwise edge of the positive electrode current collector so that the positive electrode current collector and the insulating material parts at both lengthwise edges of the current collector are integrated. When integrated, the positive electrode current collector and the insulating material parts can be handled as one core member.

It is preferable that the insulating material part extending in the plane of the positive electrode current collector be a low-cost insulator having good workability. Examples of the insulating material part include polypropylene, polyethylene, polyvinylidene fluoride, and polyethylene terephthalate. They may be used singly or in combination of two or more of them.

It is preferable that the positive electrode current collector be wholly covered with the positive electrode active material part.

The insulating material part extending in the plane of the positive electrode current collector is not an essential element of this embodiment. Instead, the positive electrode active material may be filled between the edge of the positive electrode current collector and the edge of the positive electrode active material part. In this case, the positive electrode current collector is also wholly covered with the positive electrode active material part.

In the case of not providing the insulating material part extending in the plane of the positive electrode current collector, it is preferable that each lengthwise edge of the positive electrode current collector be coated with an insulating material. As the insulating material coating the edges of the positive electrode current collector, polypropylene, polyethylene, polyvinylidene fluoride, polyethylene terephthalate and the like may be used. Alternatively, thermal spraying of ceramic such as alumina may be used to coat the edges of the positive electrode current collector with the ceramic.

Figure 3:
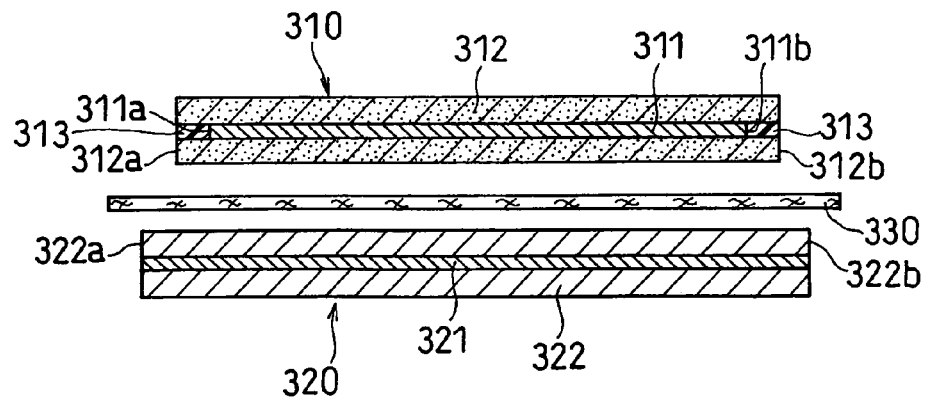
FIG. 3 is a schematic view of a section perpendicular to the longitudinal direction of the positive electrode plate, negative electrode plate and separator of an electrode plate assembly in Embodiment 2 of the present invention.

FIG. 3 is a schematic view of a section perpendicular to the longitudinal direction of a positive electrode plate 310, a negative electrode plate 320 and a separator 330 in an electrode plate assembly of this embodiment, and FIG. 3 is illustrated in the same manner as FIG. 1.

The positive electrode plate 310 comprises a positive electrode current collector 311 and a positive electrode active material part 312, and the negative electrode plate 320 comprises a negative electrode current collector 321 and a negative electrode active material part 322. The positive electrode plate 310 and the negative electrode plate 320 are opposed to each other with the separator 330 interposed between them. An insulating material part 313 extends between an edge 311a of the positive electrode current collector and an edge 312a of the positive electrode active material part and between an edge 311b of the positive electrode current collector and an edge 312b of the positive electrode active material part.

The lengthwise edges 312a and 312b of the positive electrode active material part are positioned on outer sides of the lengthwise edges 311a and 311b of the positive electrode current collector. In such an arrangement, when the laminated parts of the positive electrode active material part 312 and the insulating material part 313 are slit, the positive electrode current collector 311 is not slit, so that conductive burrs do not occur.

In employing the structure as illustrated in FIG. 3, there is no particular limitation with respect to the interval between the edge 311a of the positive electrode current collector and the edge 312a of the positive electrode active material part and the interval between the edge 311b of the positive electrode current collector and the edge 312b of the positive electrode active material part, but these intervals are preferably 2 mm or less.

Embodiment 3

This embodiment is directed to a lithium ion secondary battery including an electrode plate assembly so configured that each lengthwise edge of the negative electrode active material part is positioned on an outer side of each lengthwise edge of the positive electrode current collector, that each lengthwise edge of the positive electrode current collector is positioned on an outer side of each lengthwise edge of the positive electrode active material part, and that exposed parts of the positive electrode current collector which are not covered with the positive electrode active material part are coated with an insulating material.

In such an arrangement, the edges of the positive electrode current collector are opposed to the surface of the negative electrode active material part. However, since the exposed parts of the positive electrode current collector which are not covered with the positive electrode active material part are coated with an insulating material, even if burrs occur on the positive electrode current collector, no short-circuit occurs between the burrs and the surface of the negative electrode active material part.

As the insulating material covering the exposed parts of the positive electrode current collector, polypropylene, polyethylene, polyvinylidene fluoride, polyethylene terephthalate and the like may be used. They may be used singly or in combination of two or more of them. Alternatively, thermal spraying of ceramic such as alumina may be employed to coat the exposed parts of the positive electrode current collector with the ceramic. Also, an insulating tape may be affixed to the exposed parts of the positive electrode current collector. As the insulating tape, it is preferable to use a tape comprising a base material such as polypropylene and an acrylic resin type adhesive carried on one side of the base material.

Figure 4:
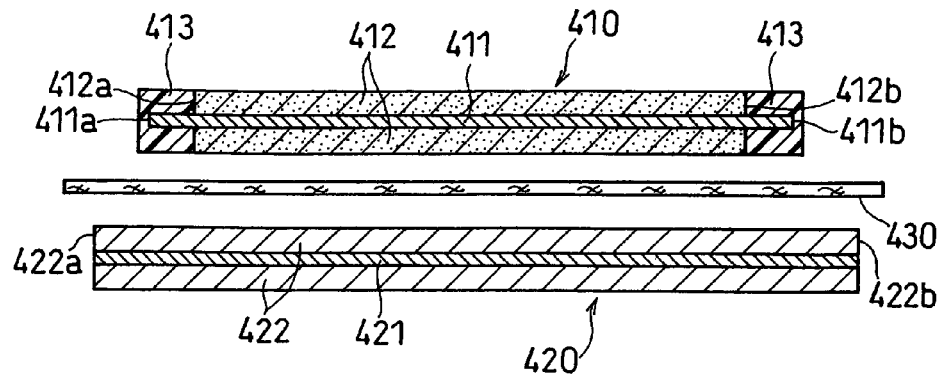
FIG. 4 is a schematic view of a section perpendicular to the longitudinal direction of the positive electrode plate, negative electrode plate and separator of an electrode plate assembly in Embodiment 3 of the present invention.

FIG. 4 is a schematic view of a section perpendicular to the longitudinal direction of a positive electrode plate 410, a negative electrode plate 420 and a separator 430 in an electrode plate assembly of this embodiment, and FIG. 4 is illustrated in the same manner as FIG. 1.

The positive electrode plate 410 comprises a positive electrode current collector 411 and a positive electrode active material part 412, and the negative electrode plate 420 comprises a negative electrode current collector 421 and a negative electrode active material part 422. The positive electrode plate 410 and the negative electrode plate 420 are opposed to each other with the separator 430 interposed between them.

At least the part between an edge 411a of the positive electrode current collector and an edge 412a of the positive electrode active material part and the part between an edge 411b of the positive electrode current collector and an edge 412b of the positive electrode active material part are coated with an insulating material 413.

Both lengthwise edges 422a and 422b of the negative electrode active material part are positioned on outer sides of the lengthwise edges 411a and 411b of the positive electrode current collector. The lengthwise edges 411a and 411b of the positive electrode current collector are positioned on outer sides of the lengthwise edges 412a and 412b of the positive electrode active material part. Also, the exposed parts of the positive electrode current collector not covered with the positive electrode active material part are coated with the insulating material 413. This positive electrode plate does not cause a short-circuit, even if burrs occur on the positive electrode current collector, between the burrs and the surface of the negative electrode active material part.

In employing the structure as illustrated in FIG. 4, there is no particular limitation with respect to the interval between the edge 422a of the negative electrode active material part and the edge 411a of the positive electrode current collector and the interval between the edge 422b of the negative electrode active material part and the edge 411b of the positive electrode current collector, but these intervals are preferably 2 mm or less. Also, there is no particular limitation with respect to the interval between the edge 411a of the positive electrode current collector and the edge 412a of the positive electrode active material part and the interval between the edge 411b of the positive electrode current collector and the edge 412b of the positive electrode active material part, but these intervals are preferably 2 mm or less.

Embodiment 4

This embodiment relates to a lithium ion secondary battery including an electrode plate assembly, wherein the positive electrode current collector comprises an insulating sheet and a conductive layer formed on each side of the insulating sheet, and an exposed part of the insulating sheet which is not covered with the conductive layer is provided at each lengthwise edge of the insulating sheet.

The positive electrode current collector in this embodiment is mostly composed of the insulating sheet, so it is lightweight. Also, when such a current collector is slit, the slit section has an insulating property, so it is free from occurrence of conductive burrs.

As the material of the insulating sheet, polypropylene, polyethylene, polyvinylidene fluoride, polyethylene terephthalate and the like may be used. These materials are also advantageous in terms of flexibility. As the conductive layer, a deposited film of aluminum, aluminum alloy or the like is preferable. The deposited film may be formed by conventional vapor deposition such as an electron beam method.

The thickness of the insulating sheet is preferably from 10 to 30 μm, and the thickness of the conductive layer is preferably from 1 to 20 μm.

In this embodiment, it is also preferable that each lengthwise edge of the negative electrode active material part be positioned on an outer side of each lengthwise edge of the positive electrode active material part.

Figure 5:
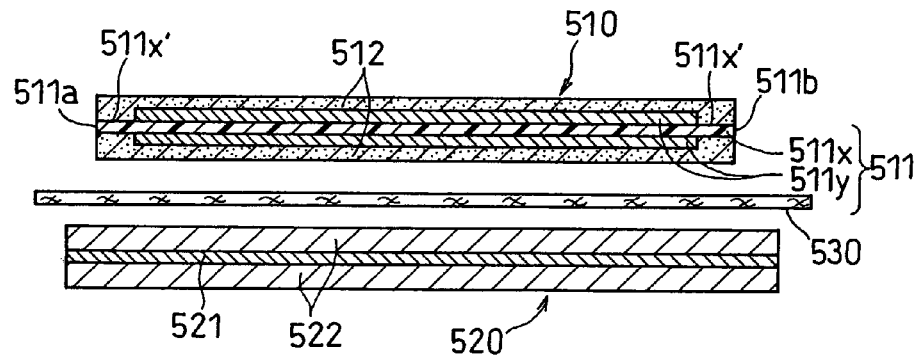
FIG. 5 is a schematic view of a section perpendicular to the longitudinal direction of the positive electrode plate, negative electrode plate and separator of an electrode plate assembly in Embodiment 4 of the present invention.

FIG. 5 is a schematic view of a section perpendicular to the longitudinal direction of a positive electrode plate 510, a negative electrode plate 520 and a separator 530 in an electrode plate assembly of this embodiment, and FIG. 5 is illustrated in the same manner as in FIG. 1.

The positive electrode plate 510 comprises a positive electrode current collector 511 and a positive electrode active material part 512, and the negative electrode plate 520 comprises a negative electrode current collector 521 and a negative electrode active material part 522. The positive electrode plate 510 and the negative electrode plate 520 are opposed to each other with the separator 530 interposed between them. The positive electrode current collector 511 comprises an insulating sheet 511x and a conductive layer 511y formed on each side of the insulating sheet, and an exposed part 511x' of the insulating sheet is provided at each lengthwise edge of the insulating sheet 511x. In employing the structure as illustrated in FIG. 5, there is no particular limitation with respect to the width of the exposed part 511x' of the insulating sheet, but the width is preferably 2 mm or less.

Both lengthwise edges 511a and 511b of the positive electrode current collector 511 have a cut section composed of the insulating sheet, and hence conductive burrs do not occur. Therefore, in spite of the opposed arrangement of the lengthwise edges 511a and 511b of the positive electrode current collector 511 and the surface of the negative electrode active material part 522, the short-circuit between the positive electrode current collector and the negative electrode active material part can be prevented.

Embodiment 5

This embodiment pertains to a lithium ion secondary battery including an electrode plate assembly, wherein each lengthwise edge of the positive electrode plate is coated with an insulating material.

Since each lengthwise edge of the positive electrode plate is coated with an insulating material, even if burrs occur on the positive electrode current collector when the positive electrode active material part and the current collector are slit at the same time, the insulating material prevents the short-circuit between the burrs and the negative electrode active material part. For example, each lengthwise edge of the conventional positive electrode plate as illustrated in FIG. 2 may be coated with an insulating material to carry out this embodiment.

Examples of the insulating material coating the lengthwise edges of the positive electrode plate include polypropylene, polyethylene, polyvinylidene fluoride, and polyethylene terephthalate. They may be used singly or in combination of two or more of them.

The step of coating the lengthwise edges of the positive electrode plate with the insulating material may be performed either before or after the slitting of the positive electrode plate. When this step is performed after the slitting of the positive electrode plate, the whole slit sections can be coated with the insulating material.

In this embodiment, it is also preferable that each lengthwise edge of the negative electrode active material part be positioned on an outer side of each lengthwise edge of the positive electrode active material part.

Figure 6:
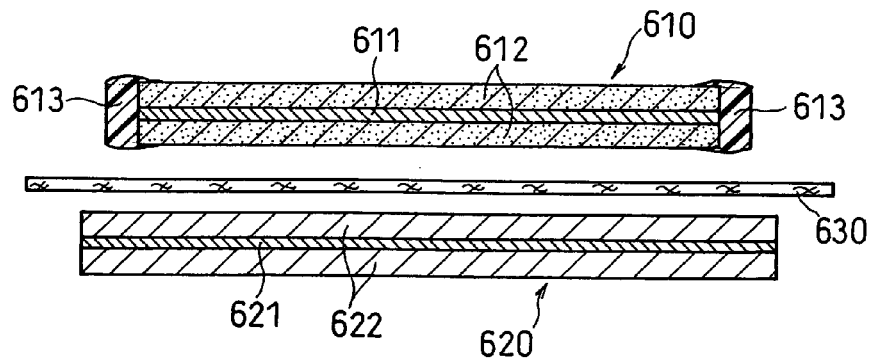
FIG. 6 is a schematic view of a section perpendicular to the longitudinal direction of the positive electrode plate, negative electrode plate and separator of an electrode plate assembly in Embodiment 5 of the present invention.

FIG. 6 is a schematic view of a section perpendicular to the longitudinal direction of a positive electrode plate 610, a negative electrode plate 620 and a separator 630 in an electrode plate assembly of this embodiment, and FIG. 6 is illustrated in the same manner as FIG. 1.

The positive electrode plate 610 comprises a positive electrode current collector 611 and a positive electrode active material part 612, and the negative electrode plate 620 comprises a negative electrode current collector 621 and a negative electrode active material part 622. The positive electrode plate 610 and the negative electrode plate 620 are opposed to each other with the separator 630 interposed between them. Since each lengthwise edge of the positive electrode plate 610 is coated with an insulating material 613, even if the positive electrode current collector has burrs, the short-circuit between the burrs and the negative electrode active material part is prevented.

In Embodiments 1 to 5, of the four sides of the positive electrode plate, the lengthwise edges/sides have been described in terms of their arrangement and constitution, but the same arrangements and constitutions may be applied to at least one of the widthwise edges/sides of the positive electrode plate. In this case, the short-circuit can be prevented more effectively. Further, the arrangements and constitutions of the positive electrode plates described in Embodiments 1 to 5 may also be employed singly or in combination.

In the following, the present invention will be more specifically described by way of examples. These examples, however, are not to be construed as limiting in any way the present invention.

EXAMPLE 1

An example of Embodiment 1 will be explained with reference to FIGS. 7 to 10.
(i) Production of Positive Electrode Plate A positive electrode plate 708 was produced by forming a positive electrode active material part 708b on each side of a positive electrode current collector 708a.

The positive electrode active material part 708b was formed by applying a positive electrode material paste on both sides of the positive electrode current collector 708a and drying and rolling the applied paste.

The positive electrode material paste was prepared by mixing a positive electrode active material $LiCoO_2$, a conductive agent acetylene black and a binder polyvinylidene fluoride in a weight ratio of 92:3:5. The binder polyvinylidene fluoride was used after being dissolved in N-methyl-2-pyrrolidone (NMP). The NMP solution of polyvinylidene fluoride was also used as a non-active material paste in the production of the positive electrode plate.

The positive electrode material paste and the non-active material paste were applied onto both sides of the positive electrode current collector 708a comprising aluminum foil having a thickness of 20 μm in such a manner as to form stripes.

Figure 8:
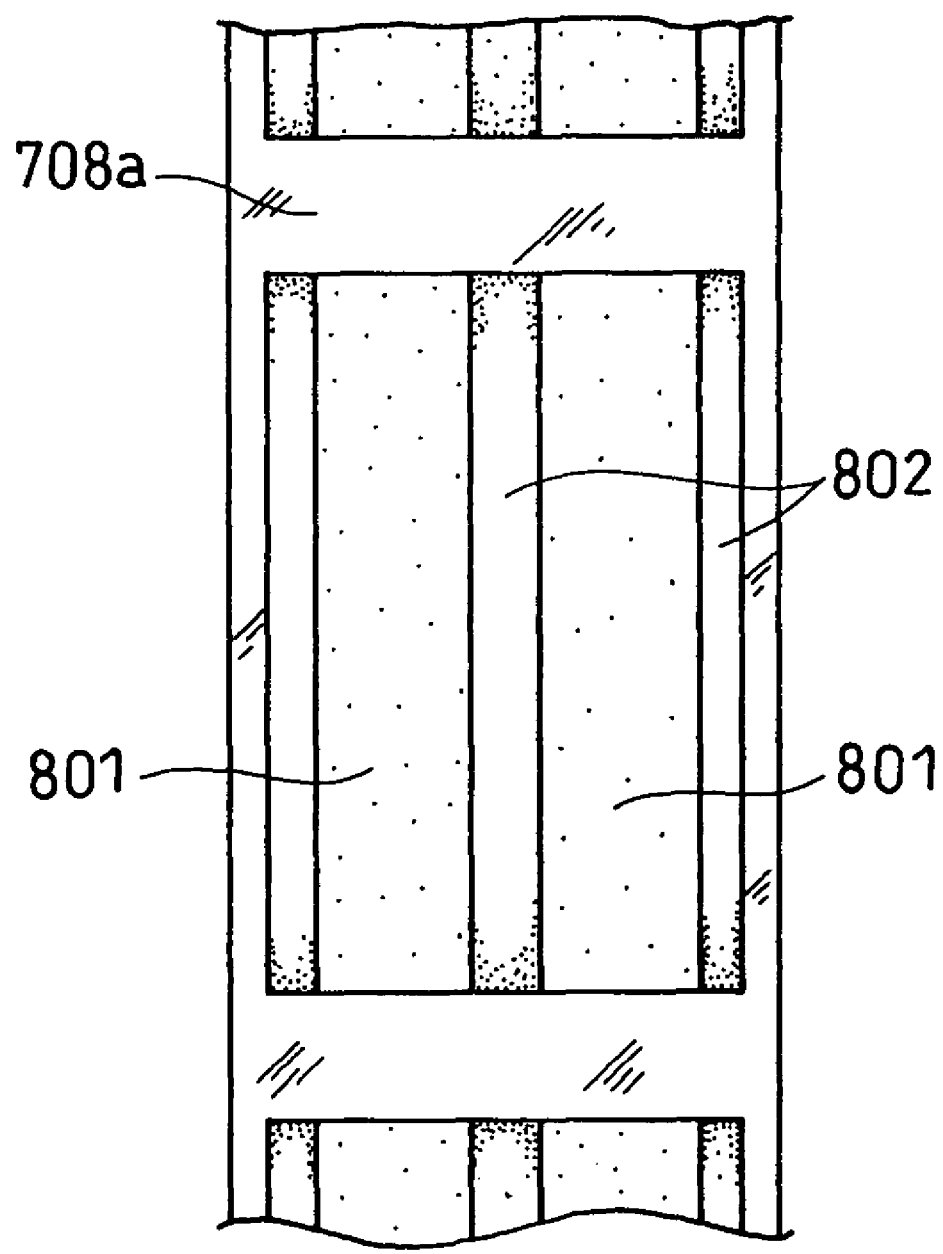
FIG. 8 is a top view of a positive electrode current collector, showing a process for producing a positive electrode plate in Example 1 of the present invention.

FIG. 8 is a top view of the positive electrode current collector 708a on which a positive electrode paste 801 and a non-active material paste 802 are applied. Where the positive electrode material paste and the non-active material paste are not applied, the positive electrode current collector 708a is exposed, and the width of the exposed part is 40 mm. The length of the positive electrode material paste 801 and the length of the non-active material paste 802 are both 419 mm. The width of the positive electrode material paste 801 is 50 mm, and the width of the non-active material paste 802 is 8 mm for the middle one and 6 mm for each of the left and right ones. The width of the unapplied parts at both lengthwise edges of the positive electrode current collector 708a is 10 mm.

Figure 9:
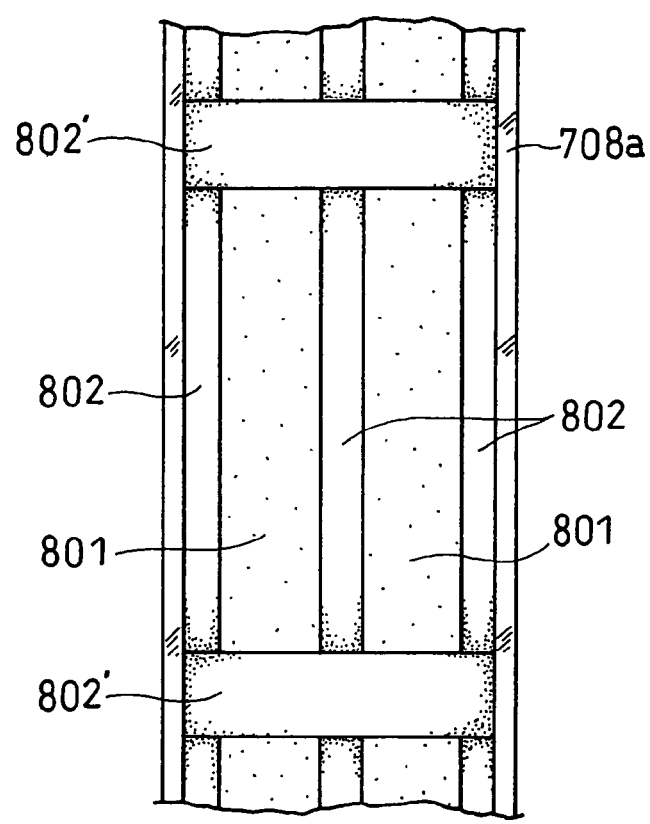
FIG. 9 is another top view of the positive electrode current collector, showing the process for producing the positive electrode plate in Example 1 of the present invention.

Subsequently, a non-active material paste 802' was also applied to the paste-unapplied parts, as illustrated in FIG. 9. The thickness of the coatings of the non-active material pastes 802 and 802' was the same as that of the coating of the positive electrode material paste 801, and the total thickness of the dried coatings on both sides was 280 μm. The whole thickness including the thickness of the positive electrode current collector 708a was 300 μm.

Thereafter, the resultant positive electrode current collector carrying the dried pastes was rolled by a roller having a diameter of 300 mm until the whole thickness thereof became 180 μm, to produce a positive electrode plate hoop having the positive electrode active material parts and the non-active material parts in a striped pattern. The positive electrode plate hoop was slit at the non-active material parts, to produce a positive electrode plate. The positive electrode material density of the obtained positive electrode plate was 3.1 g/cc.

Figure 10:
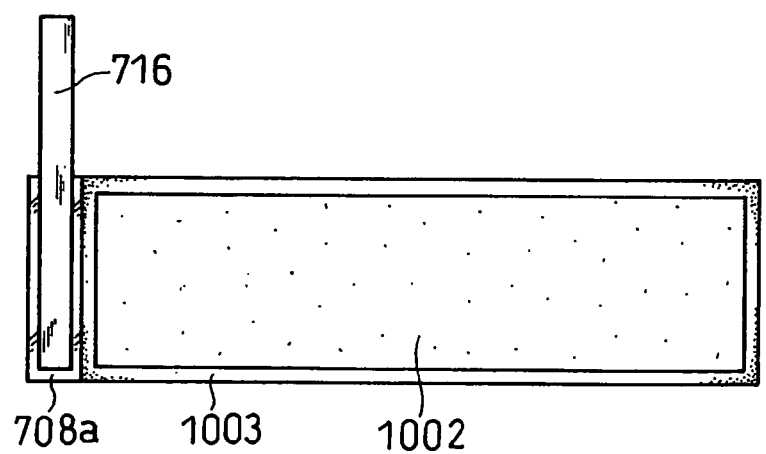
FIG. 10 is a front view of the positive electrode plate in Example 1 of the present invention.

FIG. 10 is a top view of the positive electrode plate. In FIG. 10, the positive electrode plate is 428 mm in length in the longitudinal direction and 54 mm in width. A positive electrode active material part 1002 is 419 mm in length and 50 mm in width in the same manner as the coating of the positive electrode material paste. Around the positive electrode active material part 1002 is a non-active material part 1003 having a width of 2 mm.

Part of the non-active material part 802' was peeled off in a width of 5 mm to form an exposed part of the positive electrode current collector 708a. To the exposed part was welded a positive electrode lead 716 having a length of 75 mm and a width of 3 mm. The welded part of the positive electrode lead 716 was coated with an insulating tape.

(ii) Production of Negative Electrode Plate

A negative electrode plate 709 was produced in a conventional method by forming a negative electrode active material part 709b on each side of a negative electrode current collector 709a.

The negative electrode active material part 709b was formed by applying a negative electrode material paste on both sides of the negative electrode current collector 709a and drying and rolling the applied paste.

The negative electrode material paste was prepared by mixing artificial graphite and a binder styrene-butadiene rubber (SBR) in a weight ratio of 97:3. The binder styrene-butadiene rubber was used after being dispersed in water.

The negative electrode material paste was applied onto both sides of the negative electrode current collector 709a comprising copper foil having a thickness of 14 μm. Subsequently, the resultant negative electrode current collector carrying the pastes was rolled by a roller having a diameter of 300 mm until the whole thickness including the coatings of the negative electrode material paste and the negative electrode current collector became 196 μm, to produce a negative electrode plate hoop having the negative electrode active material part.

The negative electrode plate hoop thus obtained was slit into a size which was larger than the positive electrode active material part and smaller than the whole positive electrode plate including the non-active material part, to produce a negative electrode plate. The negative electrode material density of the obtained negative electrode plate was 1.4 g/cc. The negative electrode plate was 513 mm in length in the longitudinal direction and 52 mm in width.

Part of the negative electrode active material part was peeled off in a width of 5 mm to form an exposed part of the negative electrode current collector 709a. To the exposed part was welded a negative electrode lead 717 having a length of 75 mm and a width of 3 mm. The welded part of the negative electrode lead 717 was coated with an insulating tape.

(iii) Preparation of Electrolyte

An electrolyte was prepared by dissolving lithium hexafluorophosphate ($LiPF_6$) as a solute at 1 mol/dm$^3$ in a mixed solvent of ethylene carbonate (EC) and diethyl carbonate (DEC) in a volumetric ratio of 1:1.

(iv) Assembling Step of Cylindrical Battery

Figure 7:
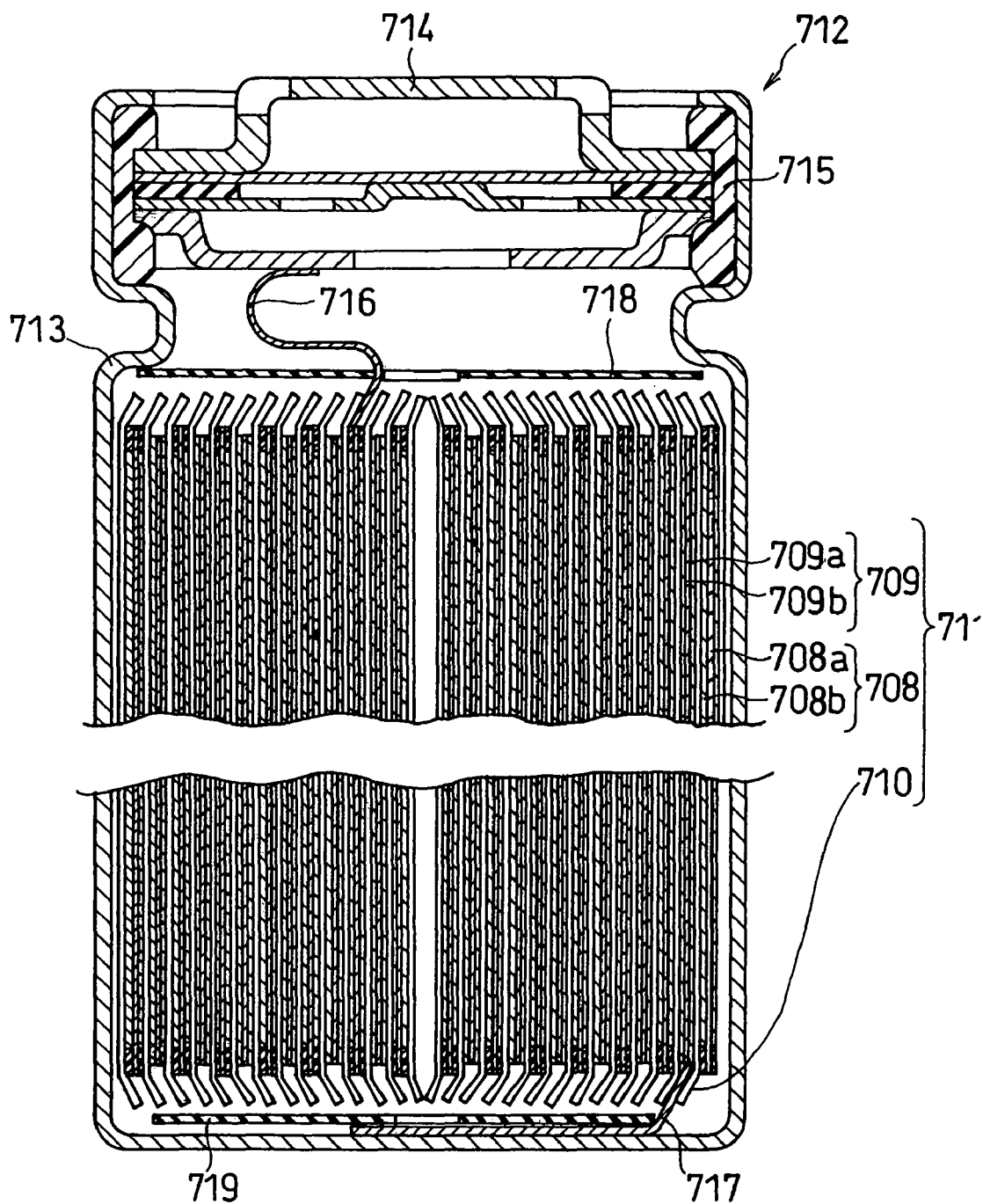
FIG. 7 is a longitudinal sectional view of a lithium ion secondary battery in Example 1 of the present invention.

A cylindrical lithium ion secondary battery as illustrated in FIG. 7 having a diameter of 18 mm and a height of 65 mm was assembled. The design capacity of the battery was 1400 mAh.

The positive electrode plate 708 and the negative electrode plate 709 were placed on opposite sides of a separator 710 of a polyethylene micro-porous film in the arrangement as illustrated in FIG. 1, and were then spirally wound to form an electrode plate assembly 711. The electrode plate assembly 711 was accommodated with the electrolyte (not shown) in a battery case 712 with an upper insulating plate 718 and a lower insulating plate 719 placed above and under the electrode plate assembly. The battery case 712 was composed of a combination of a cylindrical battery can 713 also serving as a negative electrode terminal and a sealing plate 714 also serving as a positive electrode terminal. The separator 710 was also interposed between the electrode plate assembly 711 and the inner face of the battery can 713.

The positive electrode lead 716 of the positive electrode plate 708 was connected to the backside of the sealing plate 714 through the central hole of the upper insulating plate 718. The negative electrode lead 717 of the negative electrode plate 709 was interposed between the lower insulating plate 719 and the bottom of the battery can 713. The negative electrode lead 717 and the bottom of the battery can 713 were welded inside the central hole of the lower insulating plate 719. The opening of the battery can 713 was sealed with the sealing plate 714 with insulating packing 715 fitted between the opening edge of the battery can 713 and the circumferential edge of the sealing plate 714, so that the battery case 712 was hermetically sealed.

The electrode plate assembly of Example 1 had such a structure that each lengthwise edge of the positive electrode current collector was positioned on an outer side of each lengthwise edge of the negative electrode active material part. Thus, even if the burrs produced at the edges of the positive electrode current collector pierce the separator, this structure is considered to prevent the short-circuit between the burrs and the negative electrode active material part. Also, since the non-active material part comprising the insulating material is formed near the edges of the positive electrode plate, the positive electrode current collector is stabilized while a general short-circuit is unlikely to occur. Further, the thickness of the non-active material part is the same as that of the positive electrode active material part, so that there is no difference in height between them and they make a flat, smooth surface. Thus, upon winding of the electrode plates, winding deviation is unlikely to occur.

EXAMPLE 2

An example of Embodiment 2 will be described with reference to FIGS. 11 to 13.

(i) Production of Positive Electrode Plate

As illustrated in FIG. 11, 20-μm-thick aluminum foil 1101 serving as a positive electrode current collector and two 20-μm-thick polypropylene films 1102 serving as insulating material parts were arranged in three rows to produce a positive electrode core member. The width of the aluminum foil 1101 was 48 mm, and the width of each of the two polypropylene films 1102 arranged on both sides of the aluminum foil 1101 along the longitudinal direction was 5 mm. The positive electrode core member composed of the three constituting elements was placed on a coating machine of a positive electrode material paste.

As illustrated in FIG. 12, a positive electrode material paste 1201, which was the same as that prepared in Example 1, was applied on both sides of the positive electrode core member in a width of 52 mm so as to partly cover the insulating material parts comprising the polypropylene films 1102. In FIG. 12, a broken line designates the boundary between the aluminum foil and the polypropylene film.

It is noted that aluminum foil and polypropylene film may be arranged, for example, in five or seven rows, to effectively produce a larger number of positive electrode plates.

In the same manner as in Example 1, the whole thickness including the positive electrode current collector and the dried coatings on both sides thereof was 300 μm, and the resultant positive electrode current collector carrying the coatings was rolled until the whole thickness became 180 μm, to produce a positive electrode plate hoop having a positive electrode active material part. The positive electrode plate hoop was slit at the laminated parts of the polypropylene film 1102 (insulating material part) and the positive electrode active material part, to produce a positive electrode plate.

FIG. 13 is a top view of the positive electrode plate. In FIG. 13, the positive electrode plate is 428 mm in length in the longitudinal direction and 50 mm in width.

Part of a positive electrode active material part 1302 was peeled off in a width of 5 mm to form an exposed part of the positive electrode current collector 1101, and a positive electrode lead 1316, which was the same as that of Example 1, was mounted on the exposed part. At each lengthwise edge of the positive electrode plate, there remained a 1-mm-wide laminated part of the polypropylene film and the positive electrode active material part.

(ii) Production of Negative Electrode Plate

A negative electrode plate was produced by slitting a negative electrode plate hoop prepared in the same manner as in Example 1 into a size larger than the positive electrode plate. The constitution and size of the negative electrode plate were the same as those of Example 1.

(III) Assembling Step of Cylindrical Battery

A cylindrical lithium ion secondary battery having a diameter of 18 mm, a height of 65 mm and a design capacity of 1400 mAh was assembled in the same manner as in Example 1.

The positive electrode plate and the negative electrode plate produced in the above manner were placed on opposite sides of a separator of a polyethylene micro-porous film in the arrangement as illustrated in FIG. 3, and were then spirally wound to form an electrode plate assembly. A battery of Example 2 was assembled in the same manner as in Example 1 except for the use of this electrode plate assembly.

In the electrode plate assembly of the battery of Example 2, the positive electrode plate hoop was slit at the laminated parts of the polypropylene film (insulating material part) and the positive electrode active material part. Thus, it is considered that no conductive burrs occur at the lengthwise edges of the positive electrode plate.

EXAMPLE 3

Figure 14:
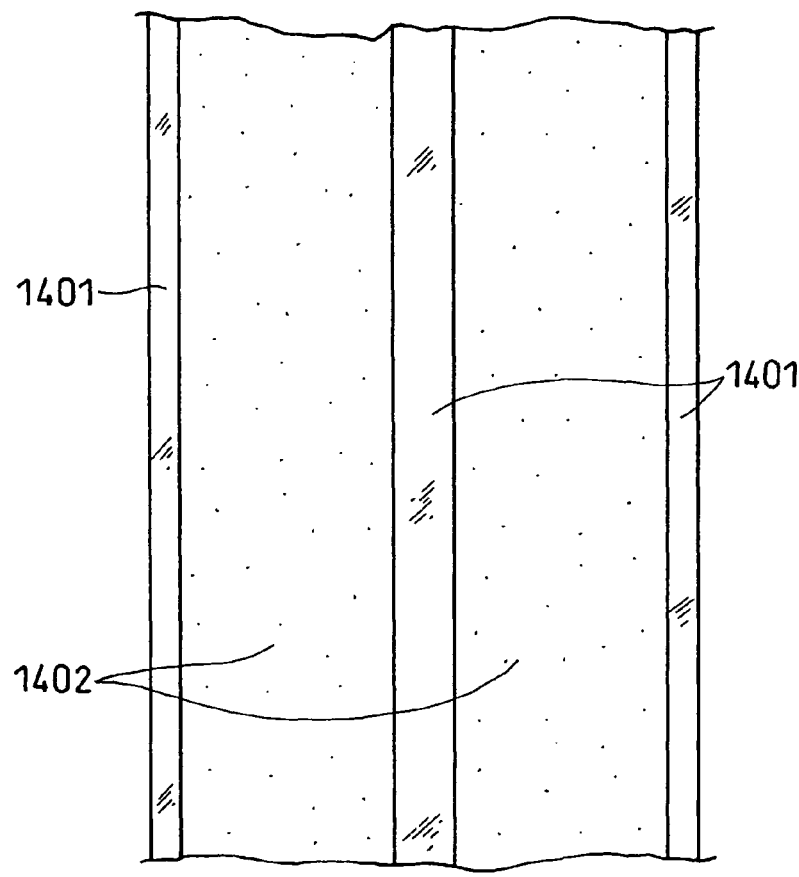
FIG. 14 is a top view of a positive electrode current collector, showing a process for producing a positive electrode plate in Example 3 of the present invention.

An example of Embodiment 3 will be described with reference to FIGS. 14 and 15.
(i) Production of Positive Electrode Plate As illustrated in FIG. 14, a positive electrode material paste 1402, which was the same as that prepared in Example 1, was applied in a striped pattern on both sides of a positive electrode current collector 1401, which was the same as that used in Example 1. In FIG. 14, the width of the positive electrode material paste was 50 mm for both left and right ones, and the width of the exposed part of the current collector was 8 mm for the middle one and 4 mm for the left and right ones.

In the same manner as in Example 1, the whole thickness including the positive electrode current collector and the dried coatings on both sides thereof was 300 μm, and the resultant positive electrode current collector carrying the coatings was rolled until the whole thickness became 180 μm, to produce a positive electrode plate hoop having positive electrode active material parts 1501. The positive electrode plate hoop was slit at the exposed parts of the current collector, and as illustrated in FIG. 15, the remained exposed parts of the current collector were coated with an insulating tape 1509 having a width of 1 mm, to produce a positive electrode plate.

Figure 15:
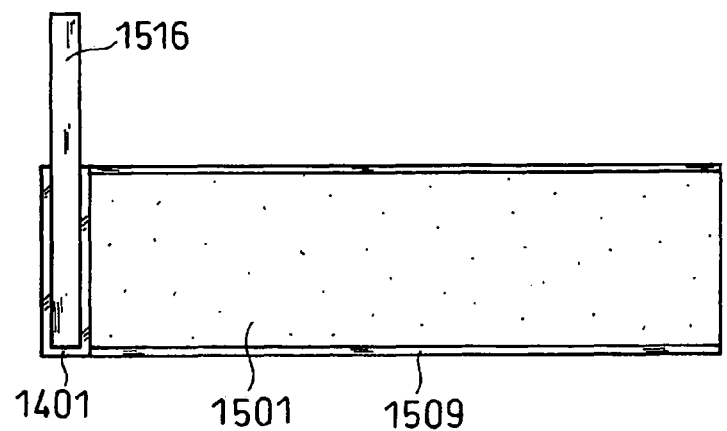
FIG. 15 is a front view of the positive electrode plate in Example 3 of the present invention.

In FIG. 15, the positive electrode plate is 428 mm in length in the longitudinal direction and 52 mm in width. Part of the positive electrode active material part 1501 was peeled off in a width of 5 mm to form an exposed part of the positive electrode current collector 1401, and a positive electrode lead 1516, which was the same as that of Example 1, was mounted to the exposed part.

(ii) Production of Negative Electrode Plate

A negative electrode plate was produced by slitting a negative electrode plate hoop prepared in the same manner as in Example 1 into a size larger than the positive electrode plate. The constitution and size of the negative electrode plate were the same as those of Example 1.

(III) Assembling Step of Cylindrical Battery

A cylindrical lithium ion secondary battery having a diameter of 18 mm, a height of 65 mm and a design capacity of 1400 mAh was assembled in the same manner as in Example 1.

The positive electrode plate and the negative electrode plate produced in the above manner were placed on opposite sides of a separator of a polyethylene micro-porous film in the arrangement as illustrated in FIG. 4, and were then spirally wound to form an electrode plate assembly. A battery of Example 3 was assembled in the same manner as in Example 1 except for the use of this electrode plate assembly.

In the electrode plate assembly of the battery of Example 3, the edges of the positive electrode current collector were coated with the insulating tape. Thus, even if burrs occur at the edges of the positive electrode current collector, it is considered that no short-circuit occurs between the burrs and the negative electrode active material part.

EXAMPLE 4

An example of Embodiment 4 will be described with reference to FIGS. 16 to 18.
(i) Production of Positive Electrode Plate As illustrated in FIG. 16, Al deposited films 1602 having a thickness of 5 μm were formed on both sides, at the same positions, of a hoop-shaped polypropylene sheet 1601 having a thickness of 20 μm in such a manner as to leave an exposed part of the polypropylene sheet having a width of 10 mm or more around each of the Al deposited films 1602. Each Al deposited film 1602 was 426 mm in length and 48 mm in width.

Next, as illustrated in FIG. 17, a positive electrode material paste 1701 prepared in the same manner as in Example 1 was applied on both sides, at the same position, of the polypropylene sheet 1601, one side at one time. Then, at one end of the Al deposited film 1602, there was left a 5-mm-wide exposed part 1702 of the Al deposited film where the positive electrode material paste was not applied. The exposed parts 1702 of the Al deposited film were formed on both sides, at the same position, of the polypropylene sheet.

In the same manner as in Example 1, the whole thickness including the positive electrode current collector and the dried coatings on both sides thereof was 300 μm, and the resultant positive electrode current collector carrying the coatings was rolled until the whole thickness became 180 μm, to produce a positive electrode plate hoop having a positive electrode active material part. The positive electrode plate hoop was slit at the parts without the Al deposited film, to produce a positive electrode plate as illustrated in FIG. 18. The positive electrode plate was 428 mm in length and 52 mm in width. Positive electrode leads 1816 having a length of 75 mm and a width of 3 mm were fixed, with a conductive adhesive, to the 5 mm-wide exposed parts 1702 of the Al deposited film formed on both sides of the positive electrode current collector, and the open ends of the positive electrode leads 1816 were welded to each other. The fixed parts of the positive electrode leads 1816 by the adhesive were coated with an insulating tape. At the lengthwise edges of the positive electrode plate, the positive electrode active material part is directly carried on the polypropylene sheet in a width of 1 mm without being carried on the Al deposited film.

(ii) Production of Negative Electrode Plate

A negative electrode plate was produced by slitting a negative electrode plate hoop prepared in the same manner as in Example 1 into a size larger than the positive electrode plate. The constitution and size of the negative electrode plate were the same as those of Example 1.

(III) Assembling Step of Cylindrical Battery

A cylindrical lithium ion secondary battery having a diameter of 18 mm, a height of 65 mm and a design capacity of 1400 mAh was assembled in the same manner as in Example 1.

The positive electrode plate and the negative electrode plate produced in the above manner were placed on opposite side of a separator of a polyethylene micro-porous film in the arrangement as illustrated in FIG. 5, and were then spirally wound to form an electrode plate assembly. A battery of Example 4 was assembled in the same manner as in Example 1 except for the use of this electrode plate assembly.

In the electrode plate assembly of the battery of Example 4, the slit sections of the positive electrode current collector were composed of an insulating material. Thus, it is thought that no conductive burrs occur and that a short-circuit is not caused by burrs.

EXAMPLE 5

An example of Embodiment 5 will be described.

(i) Production of Positive Electrode Plate

The same positive electrode material paste as that prepared in Example 1 was applied on the whole surfaces of both sides of the same positive electrode current collector as that used in Example 1.

In the same manner as in Example 1, the whole thickness including the positive electrode current collector and the dried coatings on both sides thereof was 300 μm, and the resultant positive electrode current collector carrying the coatings was rolled until the whole thickness became 180 μm, to produce a positive electrode plate hoop having a positive electrode active material part. The positive electrode plate hoop was slit into a size of 50 mm in width and 428 mm in length. Both lengthwise edges of the resultant positive electrode plate 2 mm in width were immersed in a dispersion of a polyethylene powder (melting point: about 100° C.) and dried, and the polyethylene powder affixed to the edges were then melted to form a polyethylene coating.

Part of the positive electrode active material part was peeled off in a width of 5 mm to form an exposed part of the positive electrode current collector, and a positive electrode lead, which was the same as that of Example 1, was mounted on the exposed part.

(ii) Production of Negative Electrode Plate

A negative electrode plate was produced by slitting a negative electrode plate hoop prepared in the same manner as in Example 1 into a size larger than the positive electrode plate. The constitution and size of the negative electrode plate were the same as those of Example 1.

(III) Assembling Step of Cylindrical Battery

A cylindrical lithium ion secondary battery having a diameter of 18 mm, a height of 65 mm and a design capacity of 1400 mAh was assembled in the same manner as in Example 1.

The positive electrode plate and the negative electrode plate produced in the above manner were placed on opposite sides of a separator of a polyethylene micro-porous film in the arrangement as illustrated in FIG. 6, and were then spirally wound to form an electrode plate assembly. A battery of Example 5 was assembled in the same manner as in Example 1 except for the use of this electrode plate assembly.

In the electrode plate assembly of the battery of Example 5, even if burrs occur upon slitting of the positive electrode plate, the polyethylene coatings formed at the edges of the positive electrode plate prevent the short-circuit between the burrs and the negative electrode active material part.

Comparative Example 1

A positive electrode plate hoop was prepared in the same manner as in Example 5, and was slit into a size of 50 mm in width and 428 mm in length. Using the obtained positive electrode plate without providing a polyethylene coating on both lengthwise edges, a cylindrical lithium ion secondary battery having a diameter of 18 mm, a height of 65 mm and a design capacity of 1400 mAh was assembled in the same manner as in Example 5.

[Evaluation]

The batteries of Examples 1 to 5 and Comparative Example 1 were evaluated in the following manner.

(i) For each Example, 100 batteries were prepared, and were charged at 500 mA until the battery voltage became 4.4 V, which was an overcharged state.

(ii) The overcharged batteries were pressed and broken by a flat plate until the battery voltage started lowering.

(iii) The number of batteries whose safety valve was activated by the evolution of gas due to an increase in temperature after the break was counted.

The counting results of the number of such batteries are given below.

Example 1: 0 out of 100 batteries
Example 2: 0 out of 100 batteries
Example 3: 0 out of 100 batteries
Example 4: 0 out of 100 batteries
Example 5: 0 out of 100 batteries
Comparative Example 1: 26 out of 100 batteries As described above, the lithium ion secondary battery in accordance with a present invention can prevent occurrence of burrs when a positive electrode current collector is slit. Further, even if burrs occur, a present invention can prevent the short-circuit between the burrs and a negative electrode active material part.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A lithium ion secondary battery including:
   (a) a positive electrode plate comprising a positive electrode active material part and a positive electrode current collector carrying said positive electrode active material part, said positive electrode active material part comprising a positive electrode active material capable of absorbing or desorbing a lithium ion during charge and discharge;
   (b) a negative electrode plate comprising a negative electrode active material part and a negative electrode current collector carrying said negative electrode active material part, said negative electrode active material part comprising a negative electrode active material capable of absorbing or desorbing a lithium ion during charge and discharge;
   (c) a separator interposed between said positive electrode plate and said negative electrode plate;
   (d) an electrolyte; and
   (e) a battery case accommodating said positive electrode plate, said negative electrode plate, said separator, and said electrolyte,
   wherein said positive electrode plate and said negative electrode plate are wound around an axis with said separator interposed therebetween, thereby to form an electrode plate assembly,
   said electrode plate assembly is configured that each edge parallel to a lengthwise direction of said positive electrode active material part is positioned on an outer side of each edge parallel to a lengthwise direction of said positive electrode current collector,
   said lengthwise direction of each of said positive electrode active material part and positive electrode current collector are perpendicular to the axis of winding of the electrode plate assembly, and
   an insulating material part extending in the plane of said positive electrode current collector is disposed at each edge parallel to said lengthwise direction of said positive electrode current collector.

2. The lithium ion secondary battery in accordance with claim 1, wherein said insulating material part is connected to the end face of each edge parallel to said lengthwise direction of said positive electrode current collector.

3. The lithium ion secondary battery in accordance with claim 1, wherein said insulating material part comprises at least one selected from the group consisting of polypropylene, polyethylene, polyvinylidene fluoride, and polyethylene terephthalate.

4. The lithium ion secondary battery in accordance with claim 1, wherein said positive electrode current collector is wholly covered with said positive electrode active material part.

5. The lithium ion secondary battery in accordance with claim 1, wherein each edge parallel to said lengthwise direction of said positive electrode current collector is coated with an insulating material.

6. The lithium ion secondary battery in accordance with claim 1, wherein said electrode plate assembly is so configured that each edge parallel to said lengthwise direction of said negative electrode active material part is positioned on an outer side of each edge parallel to said lengthwise direction of said positive electrode active material part,
   wherein lengthwise directions of said negative electrode active material part is perpendicular to the axis of winding of the electrode plate assembly.

* * * * *